US005686696A

United States Patent [19]

Baker, Jr. et al.

[11] Patent Number: 5,686,696

[45] Date of Patent: Nov. 11, 1997

[54] TRANSFORMER PAD

[76] Inventors: John M. Baker, Jr., 1891 Claudine Dr., Las Vegas, Nev. 89115; Jimmie Ray Meuir, 4135 W. Torino Ave., Las Vegas, Nev. 89139

[21] Appl. No.: 397,614

[22] Filed: Mar. 2, 1995

[51] Int. Cl.[6] .......... H02K 5/00

[52] U.S. Cl. .......... 174/50; 336/65

[58] Field of Search .......... 174/50; 248/19, 248/678; 336/65

[56] References Cited

U.S. PATENT DOCUMENTS

| | | | |
|---|---|---|---|
| 4,056,251 | 11/1977 | Dixon et al. | 248/19 |
| 4,107,051 | 8/1978 | Lorentzen | 210/500 |
| 4,212,446 | 7/1980 | Domanick et al. | 248/678 |
| 4,750,775 | 6/1988 | Miller | 296/38 |
| 4,775,067 | 10/1988 | Mount | 220/1 |
| 5,000,341 | 3/1991 | Shirota | 220/452 |
| 5,099,872 | 3/1992 | Tarvin | 137/312 |
| 5,244,569 | 9/1993 | Di Amico | 210/163 |
| 5,429,236 | 7/1995 | Evans | 206/386 |

*Primary Examiner*—Kristine L. Kincaid
*Assistant Examiner*—Joseph Waks
*Attorney, Agent, or Firm*—Lyon & Lyon LLP

[57] ABSTRACT

A transformer pad is disclosed for receiving and supporting a utility transformer and for collecting and containing leaking liquid from the transformer. The transformer pad includes a container in the shape of a box having an open top and providing a containment reservoir for containing liquid leaking from a transformer. A cover is provided on the open top, and the cover has a containment area onto which a utility transformer can be disposed and which includes one or more openings for receiving any leaking liquid from the transformer and directing the liquid to the interior of the container. A seal member is disposed on the cover adjacent the containment area for providing a seal around the periphery of a transformer.

20 Claims, 1 Drawing Sheet

TRANSFORMER PAD

The present invention relates to power transformers used by utility companies, and more particularly to a containment storage system for receiving and holding leaking transformer oil or fluid.

BACKGROUND

Utility systems, such as those serving a town or city, comprise a power grid having power lines for local distribution at a high voltage and this is in turn reduced to a lower voltage, usually 220V or 110V, for distribution to individual consumers within a limited area served by a step-down utility transformer. In many areas these transformers are located on power poles, and in others they are disposed on the ground or below ground. In a residential neighborhood, for example, one power transformer may serve several homes; whereas, in a commercial or industrial area there may be one or more transformers per business establishment.

The typical utility power transformer today comprises a case which houses the usual windings and conductors, and along with a transformer liquid or oil. Unfortunately, from time to time, these transformers leak because of rust or corrosion of the case, and the transformer oil flows from the transformer to the surrounding area. In those installations where the transformer is mounted on a power pole, frequently the oil leaks onto the pole or its cross members and may not significantly contaminate the ground below. On the other hand, where the transformer is disposed on the ground or below ground level, if such leaking occurs it contaminates the underlying and surrounding soil requiring clean-up of the soil.

In relatively hot areas, such as desert areas of Nevada, Arizona, and the like, the transformer leaking problem is more acute. In the Las Vegas, Nevada area for example, residential transformers are situated on the ground or below ground level, and when a leak occurs, it is necessary to remove the transformer, clean up the underlying and surrounding soil, and then reinstall a new transformer. This procedure typically involves disconnecting the electrical conductors of the faulty transformer and providing a temporary AC power source in place of the transformer while the soil is cleaned up (it is particularly necessary in hot areas to do this because the residences or other buildings cannot be without cooling or air conditioning for the frequently prolonged period of soil clean-up). The leaking transformer may be temporarily placed on a concrete slab during change out and further leak onto the surrounding soil.

The soil clean up may involve the removal of a large amount of soil for clean-up, and then replacement of the cleaned soil or other soil and compaction thereof. This process can take a number of hours, and involve a number of man-hours of work. In the meantime, if the faulty leaking transformer has not been removed to a truck or suitable dump or storage site, it further contaminates the soil where it has been placed.

In view of the foregoing, a better system for facilitating transformer replacement as well as collection of leaking transformer oil if a leak occurs, are needed.

SUMMARY OF THE PRESENT INVENTION

According to the concepts of the present invention, a device which is referred to herein as a transformer pad is provided. The transformer pad basically comprises a container upon which a utility transformer may be disposed, and which includes a top with one or more holes in the top for allowing any leaking liquid from the transformer to flow into the container. The transformer pad is constructed in a manner to be sufficiently sturdy for holding transformers of various sizes, such as from 30 to 167 KVA, or larger. The container provides a sealed containment storage area for any leaking liquid, and can include a suitable drain outlet for allowing the liquid to be drained for disposal or recycling. A flag or other indicating device can be provided on or associated with the container to indicate if and when the liquid therein reaches a predetermined level. The transformer pad may be constructed of any suitable material, such as plastic or fiberglass.

Accordingly, it is a principal object of the present invention to provide a leak containment storage system for utility power transformers.

Another object of the present invention is to provide a transformer pad for receiving and storing any leaking liquid from a transformer either during change out or replacement of a leaking transformer or as a normal installation accessory for a power transformer.

These and other objects and advantages of the present invention will become better understood through a consideration of the following description, taken in conjunction with the drawing in which:

FIG. 1 is a perspective view of a transformer pad according to the present invention adapted for receiving a transformer thereon;

FIG. 2*a* is a side elevational view of the transformer pad of FIG. 1;

FIG. 2*b* is a cross-sectional view of the pad of FIG. 1 taken along a line 2*b*—2*b* thereof;

FIG. 3*a* is a top view of the transformer pad (without the transformer) of FIG. 1;

FIG. 3*b* is a top view of the pad with the cover thereof removed;

FIG. 3*c* is a cross-sectional view of the pad taken along line 3*c*—3*c* of FIG. 3*b*; and FIG. 4 is a top view of an alternative version of the fluid collection area of the transformer pad.

DETAILED DESCRIPTION

Turning now to the figures, a transformer pad according to the present invention comprises a lower compartment 10 forming a container essentially in the shape of a rectangular box having four sides 12–15 and a bottom 17. It may, for example, be molded of plastic to provide a leak-proof container.

Figure 1:
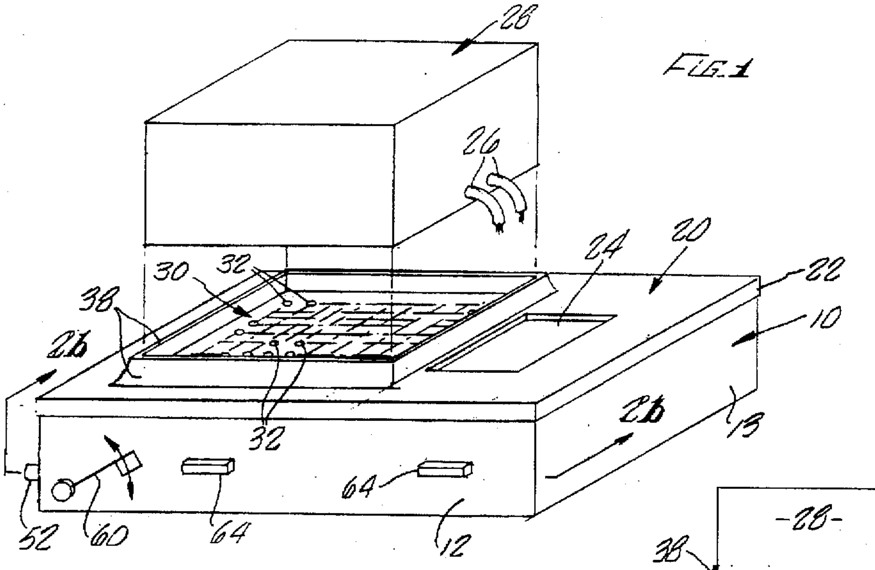
Figure 2B:
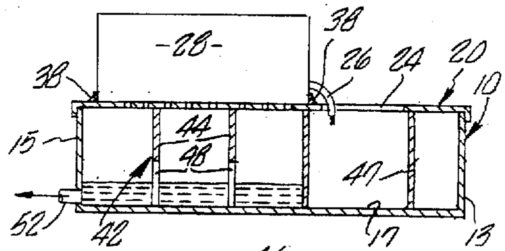
Figure 2A:
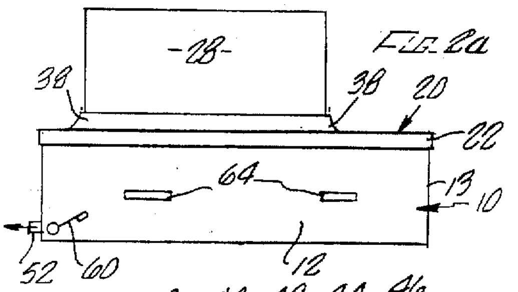
Figure 3C:
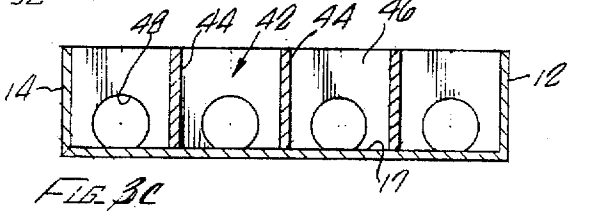
Figure 3A:
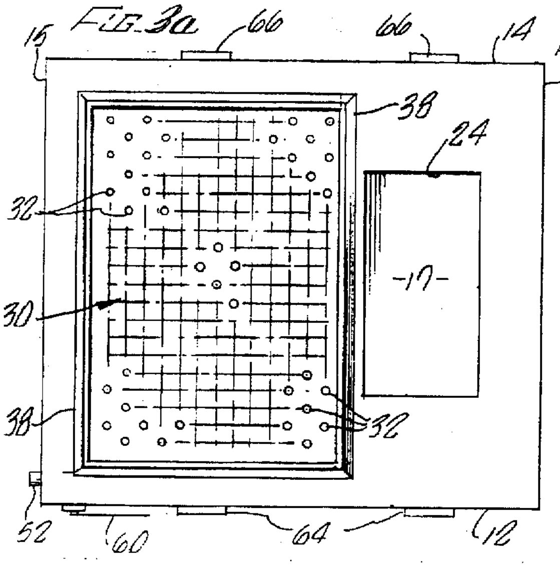
Figure 3B:
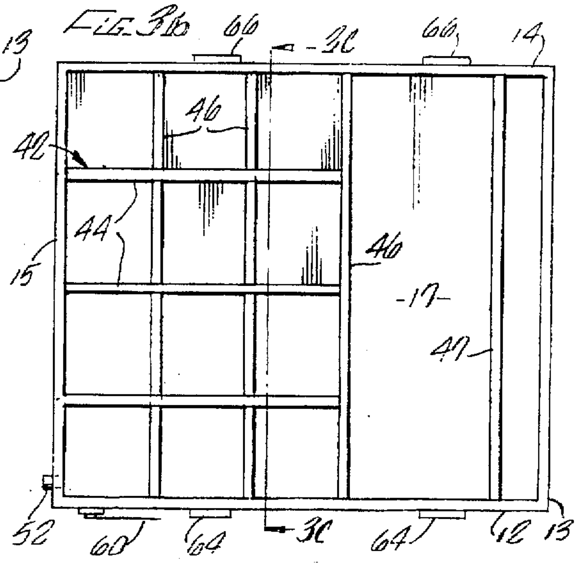

A cover 20 is provided to fit over the top of the sides 12–15 of the container 10, and has a lip 22 extending around the sides of the cover 20 so as to secure the cover onto the top of the container 10. The cover includes a relatively large opening 24 into which cables 26 of a transformer 28 may extend. The cables 26 are intended to diagrammatically indicate whatever cables (usually four or more) extend from the transformer, including connections to the primary and the secondary thereof. The cover 20 also includes a liquid collection area 30 which is substantially rectangular in shape and which in the first embodiment (FIGS. 1–3) has a large plurality of small holes 32 perforated therethrough.

The shape and size of the containment area 30 is selected to allow the transformer pad to collect any leaking oil or other liquid from a variety of transformers and transformer sizes. A flange or barrier 38 preferably is secured to the cover 20 around the containment area 30. This barrier 38 provides a flexible seal around the perimeter of the transformer 28 and may be formed of any suitable flexible material such as rubber. Its purpose is to insure that the leaking liquid flows into the containment area 30 and not elsewhere on the top of the cover 20.

Typical utility transformers are relatively heavy. Therefore, a honeycomb support structure, or other suitable support, 42 is provided within the container 10. This honeycomb structure 42 comprises sets of spaced cross-members 44, 46 extending from the bottom 17 of the container 10 upward to support the underside of the cover 20. At least the cross members 44 include apertures 48 (and the members 46 likewise can include similar openings) so as to allow the liquid in the container 10 to collect in a pool (note 54 in FIG. 2*b*) and to be drained out via a suitable drain 52 which normally is closed by any suitable cap, valve, or the like (not shown). A further cross-member 47 is provided (FIGS. 2*b*, 3*b*) to further help support the top 20.

The transformer pad can include a pivotal flag 60 which can extend into the interior of the container 10 and be attached to a float (not shown) so as to rotate and provide an exterior indication of the level of the liquid pool 54 within the container 10. Also, suitable handles can be provided on each side of the container 10, such as opposite sides 12 and 14. Exemplary handles are shown at 64 and 66.

Figure 4:
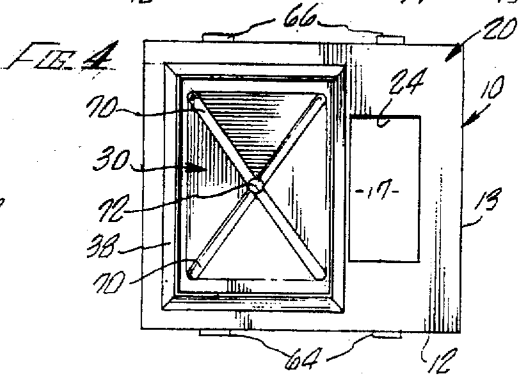

An alternative embodiment of the containment area 30 is illustrated in FIG. 4. In this arrangement, the cover 20 includes a set of troughs or channels 70 which incline slightly downwardly to an opening 72, rather than employing a plurality of perforated holes 32 as shown in the earlier embodiment. In the FIG. 4 arrangement, leaking oil flows onto the containment area 30, and down the troughs 70 into the opening 72 and, consequently, into the interior of the container 10.

Exemplary dimensions for the transformer pad shown herein are three and one-half to five and one-half feet for the lengths of sides 12 and 14, and two and one-half to four and one-half feet for sides 13 and 15. A typical height range for the container 10 is one-half foot to one and one-half feet. A typical height for the barrier 38 is approximately one inch to eight inches. The entire transformer pad may be molded of plastic or fiberglass, or any other suitable material. The honeycomb structure 42 likewise can be formed of similar materials, or metal if desired. A tiedown bracket or brackets can be provided on the cover to enable the transformer 28 to be secured to the transformer pad. This helps maintain the transformer on the pad if hit by a car or other vehicle.

The criteria with regard to sizes and materials is that they be sufficient to support and contain the size or sizes of transformers to be used with the transformer pad. Although the transformer pad of the present invention is particularly useful during change out of a leaking transformer to be replaced by a new or non-leaking transformer, the transformer pad likewise can be used to support a new transformer installation and to serve as a collection reservoir in the event the transformer leaks in the future, thereby minimizing soil clean up.

Accordingly, the transformer pad of the present invention provides a relatively simple device for facilitating clean-up in the case of a leaking transformer, or a device which can be used to support a transformer even when it is in service so as to collect liquid therefrom if a leak occurs, or even just for storage of a transformer.

While embodiments of the present invention have been shown and described, various modifications may be made without departing from the scope of the present invention, and all such modifications and equivalents are intended to be covered.

What is claimed is:

1. A transformer pad for receiving and supporting a utility transformer and for collecting and containing leaking liquid from the transformer comprising a container substantially in the shape of a rectangular box having an open top and having connected sides and a bottom for providing a containment reservoir for containing liquid, a cover adapted to fit on and cover the open top of the container, the cover having a containment area onto which the utility transformer can be disposed, and which includes at least one opening for receiving any leaking liquid from the transformer and directing the liquid to the interior of the container, the cover having an opening for receiving a power transformer cable, and a seal member disposed on the cover adjacent the containment area for providing the seal around the periphery of the transformer to be disposed on a cover.

2. A transformer pad as in claim 1 wherein the containment area includes a plurality of perforated holes.

3. A transformer pad as in claim 1 including a plurality of structural members disposed within the container to help support the transformer to be disposed on the cover.

4. A transformer pad as in claim 3 wherein at least some of the structural members include openings therein for allowing liquid to evenly pool within the container.

5. A transformer pad as in claim 1 including a drain opening for facilitating draining of liquid from the container.

6. A transformer pad as in claim 1 wherein the exterior of the container includes a plurality of handle members for facilitating moving or transporting of the transformer pad.

7. A transformer pad for receiving and supporting a utility transformer and for collecting and containing leaking liquid from the transformer comprising a container substantially in the shape of a rectangular box having an open top and having connected sides and a bottom for providing a containment reservoir for containing liquid, and a cover adapted to fit on and substantially cover the open top of the container, the cover having a liquid containment area onto which the utility transformer can be disposed and which has a shape similar to a side of the transformer, and which includes at least one opening for receiving any leaking liquid from the transformer and directing the liquid to the interior of the container.

8. A transformer pad in claim 7 wherein the cover has an opening for receiving a power transformer cable, and a seal member is disposed on the cover adjacent the containment area adopted to provide a seal around the periphery of the transformer.

9. A transformer pad as in claim 7 wherein the containment area includes a plurality of perforated holes, and the pad includes a plurality of structural members disposed within the container to help support the transformer to be disposed on the cover.

10. A transformer pad for receiving and supporting a utility transformer and for collecting and containing leaking liquid from the transformer comprising a container substantially in the shape of a rectangular box having an open top and having connected sides and a bottom for providing a containment reservoir for containing liquid, a cover adapted to fit on and cover the open top of the container, the cover having a containment area onto which the utility transformer can be disposed, and which includes a plurality of holes for receiving any leaking liquid from the transformer and directing the liquid to the interior of the container, a seal member disposed on the cover adjacent the containment area for providing a seal around the periphery of the transformer to be disposed on the cover, and a plurality of structural members disposed in a honeycomb fashion within the container to help support the transformer to be disposed on the cover.

11. A transformer pad as in claim 10 wherein at least some of the structural members include openings therein for allowing liquid to evenly pool within the container.

12. A transformer pad as in claim 10 including a drain opening for facilitating draining of liquid from the container.

13. A transformer pad as in claim 10 wherein the exterior of the container includes a plurality of handle members for facilitating moving or transporting of the transformer pad.

14. A transformer pad for receiving and supporting a utility transformer and for collecting and containing leaking liquid from the transformer comprising a container substantially in the shape of a rectangular box having an open top and having connected sides and a bottom for providing a containment reservoir for containing liquid, a cover adapted to fit on and cover the open top of the container, the cover having a containment area onto which the utility transformer can be disposed, and which includes troughs and at least one opening extending into the interior of the container for receiving any leaking liquid from the transformer and directing the liquid to the interior of the container, the cover having an opening for receiving a power transformer cable, and a seal member disposed on the cover adjacent the containment area for providing a seal around the periphery of the transformer to be disposed on the cover.

15. A transformer pad for receiving and supporting a utility transformer and for collecting and containing leaking liquid from the transformer comprising a container substantially in the shape of a rectangular box having an open top and having connected sides and a bottom for providing a containment reservoir for containing liquid, a cover adapted to fit on and cover the open top of the container, the cover having a containment area onto which the utility transformer can be disposed, and which includes at least one opening for receiving any leaking liquid from the transformer and directing the liquid to the interior of the container, the cover having an opening for receiving a power transformer cable, a seal member disposed on the cover adjacent the containment area for providing a seal around the periphery of the transformer to be disposed on the cover, and a flag member disposed with respect to the container for indicating the level of liquid contained therein.

16. A transformer pad for receiving and supporting a utility transformer and for collecting and containing leaking liquid from the transformer comprising a container substantially in the shape of a rectangular box having an open top and having connected sides and a bottom for providing a containment reservoir for containing liquid, a cover adapted to fit on and cover the open top of the container, the cover having a containment area onto which the utility transformer can be disposed, and which includes a plurality of holes for receiving any leaking liquid from the transformer and directing the liquid to the interior of the container, a seal member disposed on the cover adjacent the containment area for providing a seal around the periphery of the transformer to be disposed on the cover, a plurality of structural members disposed in a honeycomb fashion within the container to help support the transformer to be disposed on the cover, and a flag member disposed with respect to the container for indicating the level of liquid collected therein.

17. A transformer pad for receiving and supporting a utility transformer and for collecting and containing leaking liquid from the transformer comprising a container substantially in the shape of a rectangular box having an open top and having connected sides and a bottom, said container partially defining a substantially sealed containment storage area for providing a containment reservoir for containing liquid, and a cover adapted to fit on and substantially close the open top of the container thereby further defining the substantially sealed containment area within the container, the cover having a containment area onto which the utility transformer can be disposed, the containment area having a shape similar to a side of the transformer and including at least one opening extending into the sealed containment storage area of the container for receiving any leaking liquid from the transformer and directing the liquid to the sealed containment storage area.

18. A transformer pad as in claim 17 wherein the cover includes an opening adjacent the containment area for receiving a power transformer cable.

19. A transformer pad as in claim 18 wherein the opening for receiving a power transformer cable communicates with a portion of the container separate from the sealed containment storage area.

20. A transformer pad as in claim 17 wherein the opening extending into the containment storage area comprises a plurality of perforated holes.

* * * * *